(No Model.) 2 Sheets—Sheet 1.

J. E. CUFF.
ELECTRIC CABLE JOINT.

No. 391,517. Patented Oct. 23, 1888.

WITNESSES:
Moses L. Thom
M. A. McLoughlin

INVENTOR,
Joseph E. Cuff.
BY O'Brien & Co
his ATTORNEYS, (No Model.) 2 Sheets—Sheet 2.
J. E. CUFF.
ELECTRIC CABLE JOINT.
No. 391,517. Patented Oct. 23, 1888.
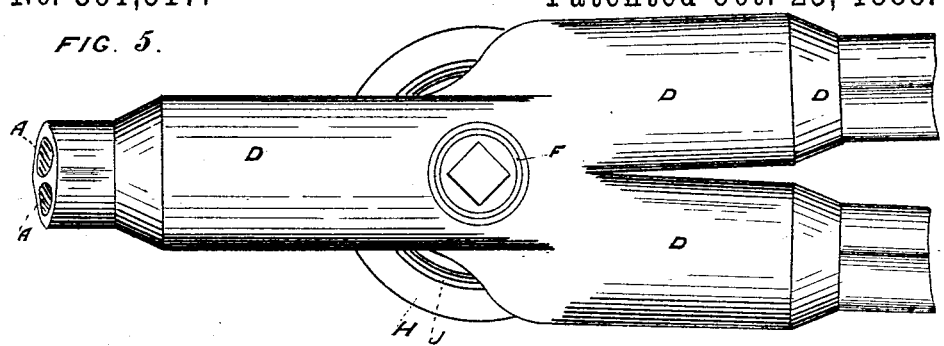
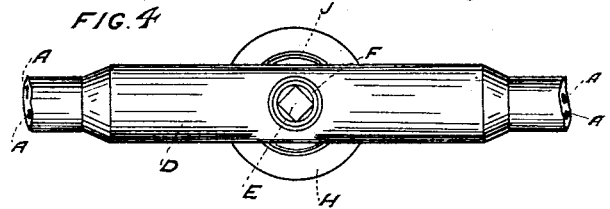
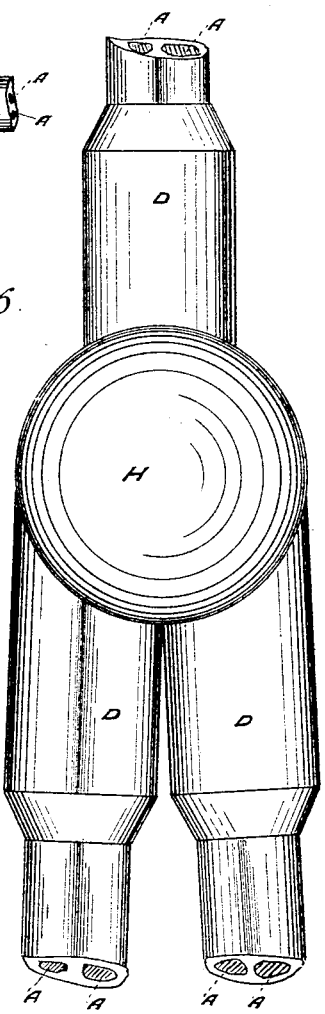
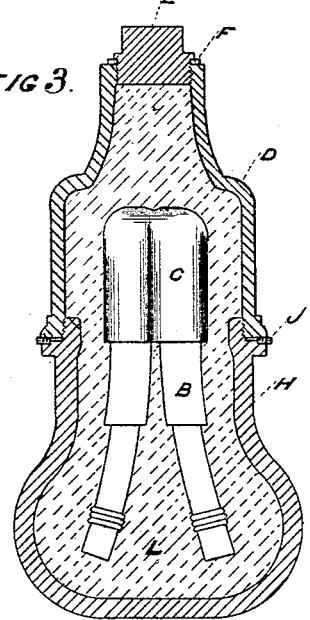
WITNESSES:
Moses L. Stern
M. A. McLaughlin
INVENTOR.
Joseph E. Cuff,
BY O'Brien & Co.
his ATTORNEYS.
N. PETERS, Photo-Lithographer, Washington, D. C.

UNITED STATES PATENT OFFICE.

JOSEPH E. CUFF, OF DENVER, COLORADO, ASSIGNOR OF ONE-HALF TO MOSES L. STERN, OF SAME PLACE.

ELECTRIC-CABLE JOINT.

SPECIFICATION forming part of Letters Patent No. 391,517, dated October 23, 1888.

Application filed April 12, 1888. Serial No. 270,501. (No model.)

*To all whom it may concern:*

Be it known that I, JOSEPH E. CUFF, a citizen of the United States, residing at Denver, county of Arapahoe, and State of Colorado, have invented a new and useful Electric-Cable Joint, of which the following is a specifiation.

The object of my invention is to overcome the difficulty heretofore experienced in uniting these cables by reason of the accumulation of moisture upon the cable and the consequent destruction of the insulation by the electric current.

It is well known that in the laying of underground electric cables man-holes are left at intervals all along the line, so that when the cable becomes defective, as is often the case, a workman may enter the man-hole, cut or disconnect the cable, and test it. As there is no means of ascertaining in what part of the cable the defect may exist except by actual test, it may be necessary to cut the cable at a number of places before the defect is accurately located. Wherever the cable is severed the two ends must be united by forming a joint of some kind. In joining these ends by the ordinary means some moisture is almost sure to accumulate, with the result heretofore stated. To overcome this trouble, and also greatly lessen the expense incidental to making the tests for defects in the cable to which I have already referred, I have invented the device shown in the accompanying drawings and hereinafter fully described.

One of my improved joints should be formed in the cable at each man-hole on the line where the cable is laid, or in the case of other than underground cables these joints should be formed wherever it may be necessary to disconnect the cable for testing or other purposes.

Figure 1:
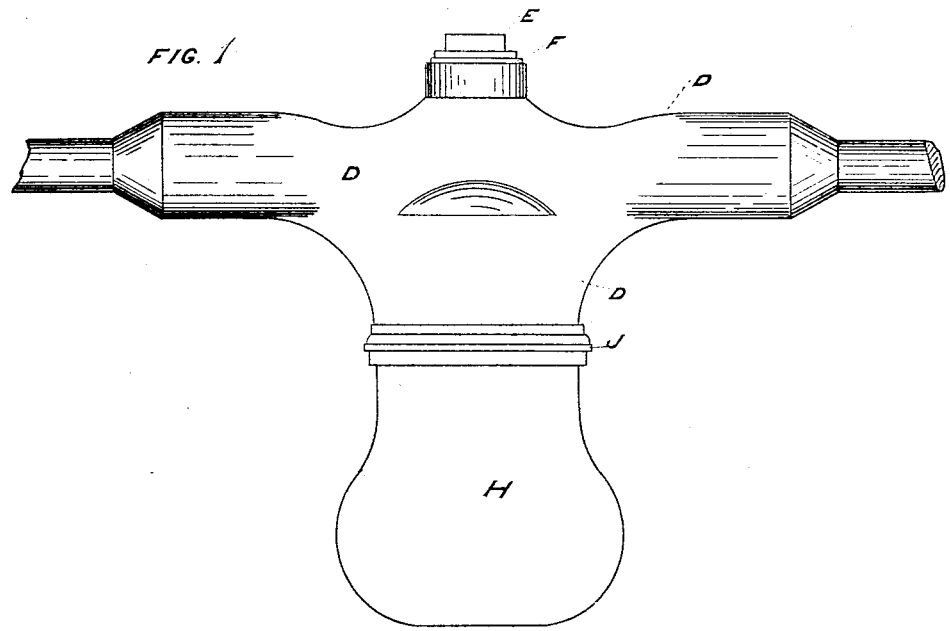
Figure 2:
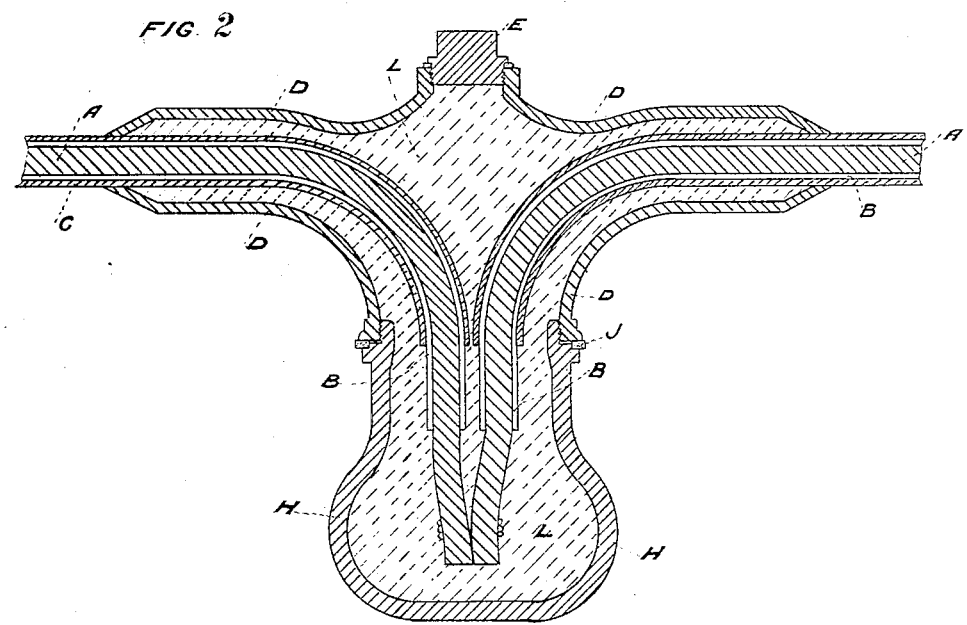

In the drawings, Figure 1 is a side elevation of my improved electric-cable joint. Fig. 2 is a longitudinal section of the same. Fig. 3 is a cross-section taken through the center of the joint without cutting the cable. Fig. 4 is a top view of the mechanism shown in Figs. 1, 2, and 3, but drawn on a smaller scale. Fig. 5 is a top view of my improved electric-cable joint, showing four cables (two positive and two negative) on one side joined to two cables (one positive and one negative) on the opposite side of the joint. Fig. 6 is a bottom view of the same.

Similar letters refer to corresponding parts throughout the several views of the drawings.

A is a cable provided with an insulator, B, and a lead covering, C.

D is a sleeve, constructed of any suitable material, preferably lead, incasing the cable and its immediate coverings. Sleeve D has openings at the top and bottom. The top opening is threaded and provided with a trap-screw, E. Underneath a shoulder on this screw a rubber gasket, F, is placed. The opening at the bottom of sleeve D is also threaded and provided with a bulb, H, threaded to correspond and screwed into said opening, as shown in Figs. 2 and 3.

Bulb H may be made of any suitable size and constructed of any suitable material; but I prefer to use glass, which, besides being a good insulator, permits the parts within to be seen after adjusting the bulb, so that the workman may be sure that all is right within the sleeve and bulb, and it also allows him to see at a glance whether the bulb has been properly filled with the insulating compound.

J is a rubber gasket placed between sleeve D and the shoulder of bulb H.

The object of gaskets F and J is to make the inclosure formed by the sleeve and bulb perfectly air and water tight.

In forming my improved electric-cable joint the two or more ends of the cable to be joined are run into opposite ends of sleeve D and clasped together, the contact portions being bare, as shown in Fig. 2. Sleeve D at its opposite extremities is then securely joined to the lead covering C of the cable by a wiped joint, making the sleeve air and water tight at these places. The clasped ends of the cable are then dipped in hot insulating compound for the purpose of removing any moisture that may have accumulated during the preceding steps of the work. The contact ends of the cable are then covered with insulating-tape and again dipped into hot insulating compound for the same purpose as before, after which bulb H is screwed on and hot insulating compound poured into sleeve D through the opening in the top, filling bulb H and the entire sleeve, as shown in Figs. 2 and 3, in which L designates the insulating composition. Trap-screw E is then inserted in the opening in the top of sleeve D, when the joint is complete, being perfectly air and water tight and perfectly secure from contact between the positive and negative sides of the cable when a two-wire or double cable is used. The parts inclosed within the sleeve and bulb are entirely free from moisture, which, if any remained before, is dried up by the hot insulating compound poured in, as stated.

In disconnecting my electric-cable joint it is only necessary to apply heat to bulb H until the insulating composition in actual contact with the inside of the bulb becomes soft, when the bulb may be easily unscrewed from the sleeve. The composition which fills bulb H is then removed from the cable, giving free access thereto, when its ends may be easily unclasped. When ready to refill the sleeve and bulb with the hot compound, it is only necessary to remove enough of the old compound remaining in the upper part of the sleeve to admit free access of the hot compound from the top, which is poured in as described.

My improved electric-cable joint may be used to advantage on all kinds of electric cables inclosed in lead, whether single or double, underground or suspended in the air, and whether used for electric-light, telegraph, telephone, fire-alarm, or messenger service.

In the use of my improved device it may be employed in joining two cable ends or any greater number, as desired, the size of sleeve D and bulb H being regulated accordingly.

Having thus described my invention, what I claim, and desire to secure by Letters Patent, is—

1. A sleeve, D, with openings at the top and bottom, and provided with trap-screw E, and bulb H, substantially as shown and described, and for the purpose set forth.

2. The electric-cable joint herein described, consisting of sleeve D, with openings at the top and bottom, and provided with a trap-screw, E, bulb H, and suitable gaskets, F and J, said sleeve and bulb being filled with insulating compound and inclosing two or more electric-cable ends suitably clasped together, substantially as shown and described, and for the purpose set forth.

3. An electric-cable joint consisting of sleeve D, wiped at its opposite extremities to the covering of the cable, so as to be air and water tight, said sleeve having openings at the top and bottom and being provided with trap-screw E, bulb H, and suitable gaskets for making the inclosure formed by the sleeve and bulb air and water tight, in combination with insulating compound, L, filling the sleeve and bulb and surrounding two or more ends of cable suitably clasped together, substantially as shown and described, and for the purpose set forth.

JOSEPH E. CUFF.

Attest:
J. B. WILLSEA,
MOSES L. STERN.